Figure 1:
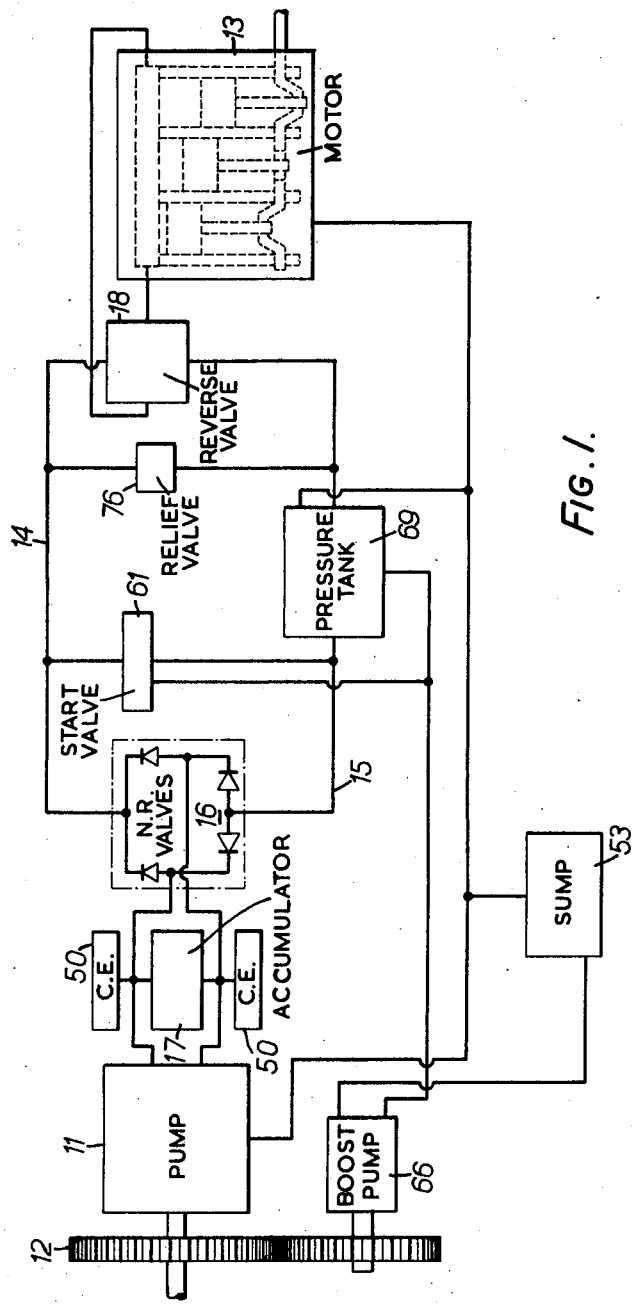

Aug. 17, 1965  F. A. SUMMERLIN  3,200,590
TRANSMISSION MECHANISM

Filed Jan. 22, 1964  5 Sheets-Sheet 3

INVENTOR
FREDERICK A. SUMMERLIN

BY
Watson, Cole, Grindle & Watson

ATTORNEYS.

INVENTOR
FREDERICK A. SUMMERLIN

United States Patent Office 3,200,590
Patented Aug. 17, 1965

3,200,590
TRANSMISSION MECHANISM
Frederick Arthur Summerlin, 58 Townsend Lane,
Harpenden, England
Filed Jan. 22, 1964, Ser. No. 339,377
Claims priority, application Great Britain, Jan. 23, 1963,
2,934/63; Mar. 4, 1963, 8,572/63; Mar. 18, 1963,
10,682/63; May 16, 1963, 19,573/63
16 Claims. (Cl. 60—51)

This invention relates to power transmission mechanism, for example a mechanism suitable for transmitting the power from the engine to the wheels of a motor car.

It has been usual in the past for such transmission mechanism to have two controls, a throttle controlling the engine speed and a control for changing the gear ratio between a number of set ratios. There have also been mechanisms with only one external control, the throttle for controlling engine speed and in which the appropriate one of a number of fixed gear ratios is automatically selected in accordance with prevailing conditions. Such mechanism requires a control which is able to determine what is the best gear ratio for the condition prevailing.

In accordance with the present invention in a hydraulic power transmission mechanism the torque transmitted is automatically determined as a function of the ratio of the input speed to the output speed.

Thus input speed can be controlled by a throttle, the output speed will depend upon the load, and the gearing ratio will set itself automatically. This setting of the ratio automatically may be effected over at least a part of the range of ratios of input speed to output speed by automatically increasing the period in a cycle over which torque is transmitted.

One form of power transmission mechanism according to the invention comprises a reciprocating hydraulic pump and a hydraulic motor connected to be driven by fluid pumped by the pump. Hydraulic flow from the pump will alternate as the pump reciprocates and it can be arranged that hydraulic pressure is applied to the motor only during the part of the pump cycle in which the pump flow is above a flow corresponding to the motor speed. As the motor speed increases hydraulic pressure will be applied to it during a smaller part of the cycle and vice versa.

There is preferably an accumulator to which fluid in excess of the requirements of the motor is pumped during the part of the cycle when pressure is applied to the motor. The fluid from this accumulator, which is conveniently pressurised, can be used to apply pressure to the motor during a further part of the cycle. A non-return valve downstream of the accumulator from the pump will enable fluid in the motor to be circulated as the motor runs during the remainder of the pump cycle.

The pump will be of the positive displacement kind with a pumping chamber whose volume is cyclically varied so that fluid is drawn in and then discharged under pressure.

Preferably, the pump is a two cylinder reciprocating pump, conveniently of the swash plate kind. Each cylinder can supply one accumulator chamber and in a preferred arrangement the single accumulator has two fluid chambers, each connected to one pump cylinder and a common air chamber for pressurising both chambers. The non-return valve arrangement can then comprise four non-return valves arranged in a bridge after the manner of the full-wave rectifier of electrical circuit practice.

It is of course possible for the pump to have more cylinders each connected to an accumulator chamber. They will however, conveniently be an even number of cylinders connected in pairs.

The accumulator may have an air chamber co-operating with a hydraulic fluid chamber and then the air chamber is preferably of limited volume so that the hydraulic pressure in the system can increase appreciably as the accumulator receives fluid. For example, the air chamber should be smaller than twice the cylinder swept volume.

For starting a load such as a motor car, a short circuiting valve can be arranged to allow the pump fluid to circulate, by-passing the motor. The short circuiting valve can be arranged to be fully closed when the speed reaches a predetermined speed for example by operation of a centrifugal device or of fluid pressure derived from a pump driven from the input shaft.

The mechanism of the kind defined is quite simple and can be used to replace an existing power transmission system in a motor car. For example, the hydraulic motor can be arranged to drive two of the wheels through a differential or alternatively, a pair of motors connected in series or parallel can be connected each to drive one wheel. The mechanism is simple to control by control of the engine speed and is expected to have a high efficiency, while a wide range of torque characteristics is available by fairly simple changes in the design of the mechanism, in particular the conditions of operating the accumulator.

Figure 2:
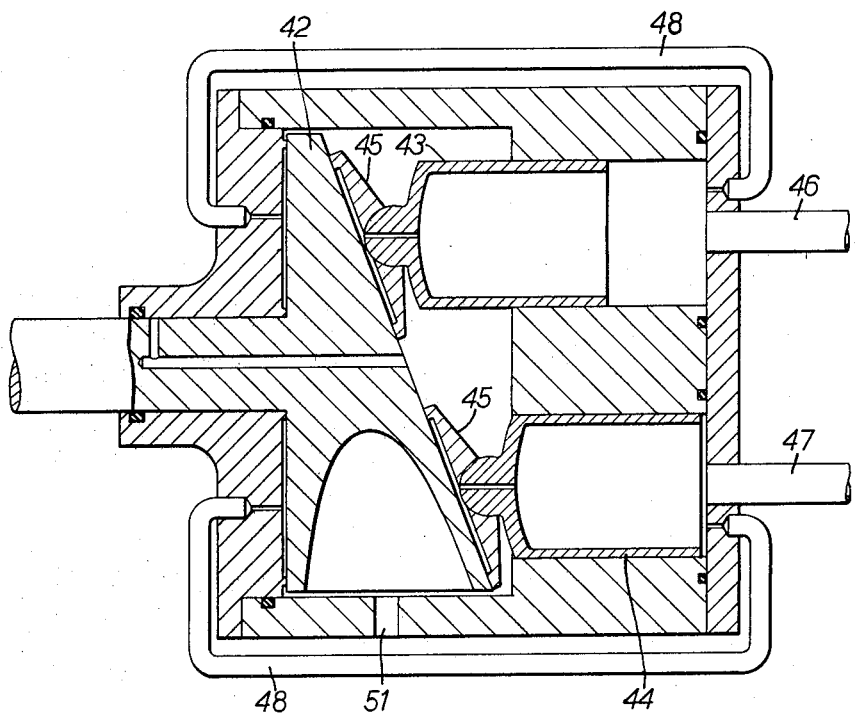
Figure 3:
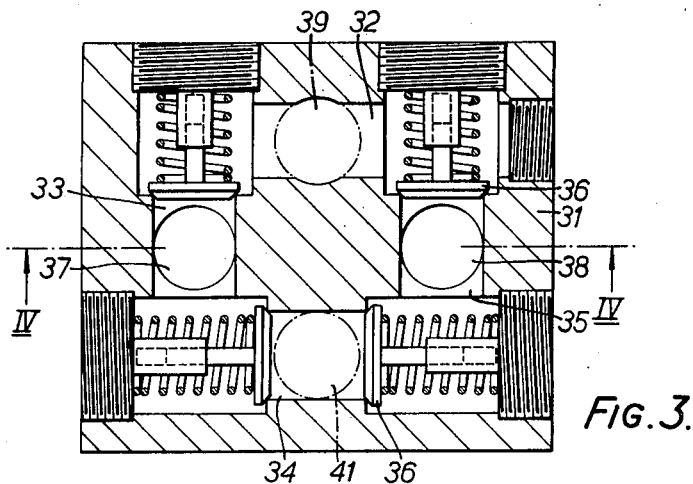
Figure 4:
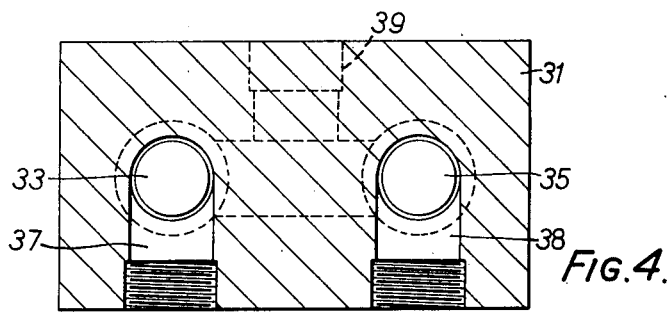
Figure 5:
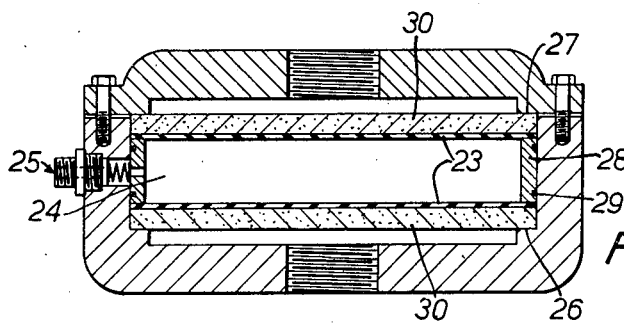
Figure 6:
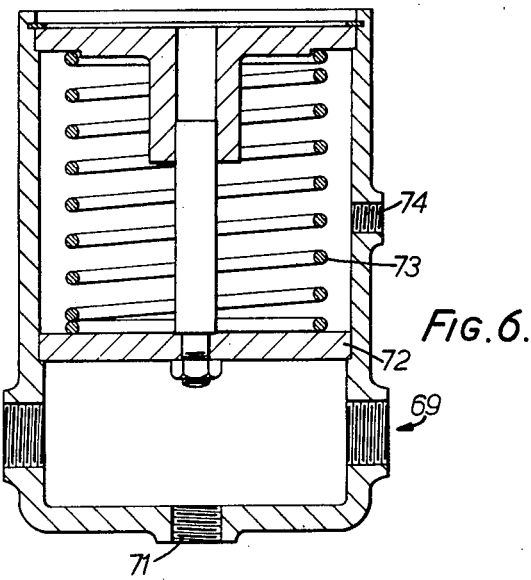
Figure 7:
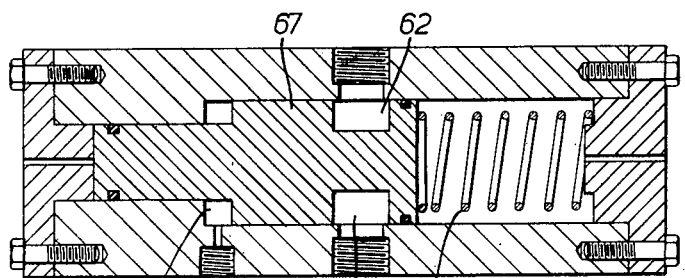
Figure 8:
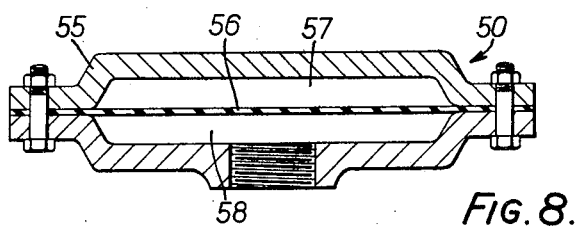
Figure 9:
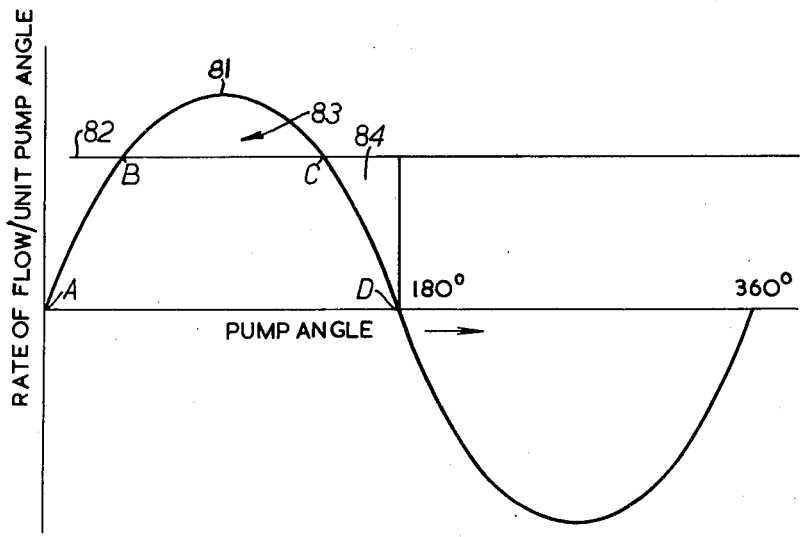
Figure 10:
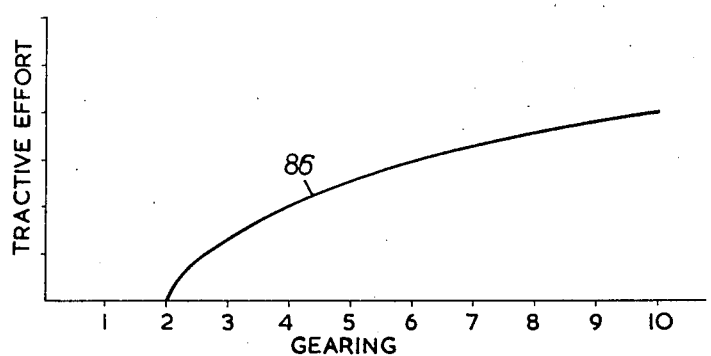

The invention may be carried into practice in various ways and one embodiment will now be described by way of example with reference to the accompanying drawings of which:

FIGURE 1 is a diagram showing the general lay out of the automatic transmission, FIGURE 2 is a sectional elevation of the pump in the transmission of FIGURE 1, FIGURE 3 is a sectional elevation of the non-return valve assembly of the transmission of FIGURE 1, FIGURE 4 is a section one the line IV—IV in FIGURE 3, FIGURE 5 is a sectional elevation of the accumulator in the transmission of FIGURE 1, FIGURE 6 is a sectional elevation of the pressurised tank of the transmission in FIGURE 1, FIGURE 7 is a sectional elevation of the starting valve of the transmission in FIGURE 1, FIGURE 8 is a sectional elevation of one of the cavitation eliminators of the transmission in FIGURE 1, and FIGURES 9 and 10 are graphs used in describing the operation of the transmission of FIGURE 1.

The transmission of FIGURE 1 may be used for driving the wheels of a motor car from an internal combustion engine. The engine drives a pump 11 through 2:1 reduction gearing, and the wheels are driven by a three cylinder in-line reciprocating hydraulic motor 13 developing 80 H.P. at 1500 r.p.m. and 1200 pounds per square inch. It has an overhead rotary valve driven from the crankshaft.

The hydraulic pump 11 is a two cylinder swash plate pump each of whose cylinders is connected to inlet and delivery lines 14 and 15 through an arrangement of four non-return valves 16 arranged in a manner analogous to the full-wave rectifier circuit of electrical practice. The pump cylinders are also connected directly each to one chamber of a double accumulator 17.

A conventional simple reversing valve 18 enables the direction of the operation of the motor 13 to be changed.

*Accumulator 17*

It is convenient at this stage to describe in more detail the construction of the accumulator which is shown in elevation in FIGURE 5. The accumulator has two fluid chambers one connected to each cylinder of the pump 11.

The two chambers are separated by rubber diaphragms 23 from a compressed air spring constituted by the interior 24 of the bag defined by the diaphragms.

When both chambers are discharged as shown in FIGURE 5 the volume of compressed air in the bag 24 is approximately that of one cylinder swept volume of the pump 11 and the pressure of air under these conditions can conveniently be arranged to be, say 1000 pounds per square inch. This air is supplied through the inlet 25. The diaphragms are supported by porous metal plates 30, for example formed of sintered metal, and are held in position between shoulders 26 and 27 on the casing and cover respectively of the accumulator, being held apart by a cylindrical spacer 28 sealed in the body of the accumulator by sealing rings 29. The edges of the rubber diaphragms 23 are gripped between the plates 30 and the spacer 28.

Non-return valve assembly

This assembly is shown in FIGURES 3 and 4 and consists of a block 31 formed with a rectangular network of passages 32, 33, 34 and 35, communicating with each other at the corners of the rectangle through spring-loaded non-return valves 36.

The connections from the two pump cylinders are at 37 and 38 in the passages 33 and 35 respectively; the outlet to the delivery line 14 is at 39 in passage 32, and the inlet from the inlet line 15 is at 41 in the passage 34.

It will be clear that oil entering at 37 or 38 under pressure can pass through non-return valves to the delivery 39 but not to the inlet 41 and this is diagrammatically illustrated at 16 in FIGURE 1. Also fluid can circulate through the motor 13 and the assembly 16, if the pump cannot supply fluid to meet the demand of the motor.

The pump 11

This is a two cylinder swash plate shown in FIGURE 2 having a swash plate 42 driven from the engine and reciprocating cylinders 43 and 44 bearing on the swash plate through hydrostatic slippers 45. The delivery lines to the non-return valve arrangement 16 are shown at 46 and 47.

Cylinder pressure is supplied over the lines 48 to areas at the rear of the swash plate 42 equal to the slipper areas in order to balance hydrostatic thrust.

The outlet 51 from the pump casing 52 leads to a sump 53 shown in FIGURE 1.

Cavitation eliminator

A cavitation eliminator 50 is shown in sectional elevation in FIGURE 8. One of these is connected at each pump delivery line to provide a source of oil enabling the non-return valves 36 in the assembly 16 to have time to operate.

The eliminator comprises a casing 55 having a diaphragm 56 separating a cavity 57 containing air at atmospheric pressure from a chamber 58 in communication with the pump delivery.

When the cylinder is pumping, the diaphragm compresses the air at 57 to the cylinder pressure, and when the suction stroke begins, virtually the full volume of the cavity is available for supplying oil to the cylinder in the period before the non-return valves open. This prevents the cylinder pressure falling below atmospheric pressure and cavitation occurring.

Starting

It is desirable when starting the engine to short circuit the pump 11 until the engine speed has risen to say 750 to 1000 r.p.m.

For this purpose a starting valve 61 is connected across the delivery and input lines 14 and 15 as shown in FIGURE 1. The valve is shown in elevation in FIGURE 7 and normally provides communication between the two parts of the short circuiting path by way of the ports 62 and 63.

The valve is operated against the pressure of a spring 64 by hydraulic pressure supplied at 65 from a boost pump 66 in FIGURE 1 which is a conventional gear pump driven through gearing 12 from the pump shaft. The pump 66 draws its supply from the sump 53 and develops a pressure across the leakages of the circuit into which it feeds proportional to engine speed. This pressure is applied to the chamber 65 and as the speed rises the valve member 67 moves to the right in FIGURE 7 against the spring until the short circuit is removed.

During this starting period and during normal operation, the system is pressurised from the boost pump 66 which charges a pressurised tank 69 in the input line 15. The tank 69 is shown in elevation in FIGURE 6 and it will be seen that as fluid is supplied from the pump 66 at 77 the piston 72 is moved upwards against a spring 73 until at a pre-determined pressure a port 74 leading to the sump 53 is opened. The spring is set in this position to maintain the pressure of 100 pounds per square inch in the system.

There is also a conventional relief valve 76 set at 2000 pounds per square inch connected across the inlet and delivery lines.

Also the casing of the motor 13 communicates with the sump 53.

The boost pump 66 can also be used to supply lubricant to the pump and motor bearings.

Operation

Each cylinder of the pump 11 can be considered to be a generator of a sinusoidal oil flow. The delivery from one cylinder over a complete cycle of the pump is shown as the sine wave 81 of FIGURE 9. The positive half of the sine wave represents the discharge stroke and the negative half the suction stroke. Superimposed on this diagram, a line 82 represents the volume of oil required by the motor 13 over this period.

In the interest of simplicity, 82 has been shown straight, although strictly for a 3 cylinder motor the fluid required by the motor will fluctuate six times per cycle.

The lines 81 and 82 are plotted as rate of flow/unit pump angle to a base of pump angle $\theta$. Thus the approximation to a sine wave 81 representing the pump output does not change as the pump rotational speed changes but if the motor demand is constant, motor demand/unit pump angle will be inversely proportional to pump rotational speed. Hence the straight line 82 representing motor demand/unit pump angle will be close to the $\theta$ axis at high pump rotational speeds and will move farther away from the $\theta$ axis as pump speeds are reduced. The pump speed at which the motor demand is equal to the peak pump output, is called synchronous speed.

When the pump speed is greater than synchronous the line 82 intersects the sine wave as shown in FIGURE 9. During the part of the cycle A–B, the pump output is insufficient to supply the load demand and the motor flow circulates through the non-return valve bridge 16 and bypasses the pump cylinders 43, 44. No pressure is applied to the motor 13 during this period. At B the pump flow exceeds the motor demand and between B and C oil is supplied to the motor. Excess oil which is represented by area 83 is stored in the accumulator 17. Thus during B–C oil at a pressure determined by the accumulator pressure is supplied to the motor. During the period C–D oil which has been stored during B–C is released, some of it supplying the motor over this period and some being returned to, and doing work on, the pump. This is shown as area 84 which is equal to area 83. Pressure is maintained on the motor during C–D also. Both cylinders of the pump operate in a similar manner. Thus pressure is applied to the motor over a proportion of the cycle determined by the intercept of the motor demand line 82 on the pump discharge curve 81. As pump speed is reduced the proportion of the cycle over which pressure is applied to the motor is reduced. If the motor demand is increased, i.e., the vehicle is moving faster, the active part of the cyle is once again reduced. It is apparent that the proportion of time during which pressure is applied to the motor is dependent only on the ratio of pump delivery to motor demand, i.e., to the ratio between engine speed and road wheel speed. This ratio may be called the "gearing."

It will be noted that if in FIGURE 9 the motor demand is equal to about one half the peak pump delivery, the period B–D during which pressure is applied by one pump cylinder becomes equal to one half of the pump cycle. Hence, since the other cylinder supplies pressure oil during the other half of the cyle, pressure is applied continuously to the motor and further increase in tractive effort due to pressure being applied for a greater proportion of the cycle cannot be produced by increasing pump speed beyond this point. However, further increase in tractive effort will result from an increase in pump speed since the amount of oil stored in the accumulator during the cycle will be increased and the pressure of the air spring 24 will increase a corresponding amount. Once again tractive effort will be a function of "gearing" only.

FIGURE 10 shows a tractive effort plotted to a base of "gearing" for transmission in which the pump details are:

Pump discharge per revolution _____ 12 cubic inches.
Accumulator spring volume (max.) ___ 6 cubic inches.
Accumulator pressure (discharged) ___ 1000 pounds per square inch.

Motor details

The motor drives the rear wheels of a motor car directly, 1500 r.p.m. producing 90 m.p.h. road speed. Motor flow per revolution is 18 cubic inches with the single motor driving two wheels via a differential.

The curve 86 shows a portion between "gearings" of 2 and 4 in which increases in tractive effort are produced principally by increases in the proportion of the cycle during which pressure is applied to the hydraulic motor. The effects of increase in quantity of oil stored in the accumulator are small over this "gearing" range. In the case shown with a static accumulator air pressure of 1000 pounds per square inch, the mean pressure increases to 1200 pounds per square inch at a "gearing" of slightly over 4 when torque is first applied to the driving wheels continuously.

For "gearings" of over 4 the increase in tractive effort is produced by increases in the quantity of oil stored in the accumulator 17 and the consequent increase in working pressure which at a "gearing" of 10 reaches 2000 pounds per square inch. At this pressure, the relief valve 76 operates to prevent any further increase in pressure.

This curve 86 can therefore be modified in a number of ways. The slope of the curve at higher "gearings" can be influenced by changes in the volume of air in the accumulator. The slope of the curve at low "gearings" can be modified by changes in the pressure to which the accumulator 17 is initially charged. The whole "gearing" scale can be multiplied or divided by a factor by changing the ratio of swept volumes of pump and motor.

What I claim as my invention and desire to secure by Letters Patent is:

1. A hydraulic power transmission mechanism comprising a positive-displacement pump having a pumping chamber, means for varying the volume of the chamber cyclically, and means for driving said pump, a hydraulic motor for driving a load, inlet and delivery fluid lines between the pump and the motor, a pressurised accumulator for hydraulic fluid connected to the pump, and a non-return value arrangement connected between the pump and the fluid lines downstream of the accumulator from the pump for insuring fluid flow in the lines only in a direction from said pump toward said hydraulic motor.

2. A mechanism as claimed in claim 1 in which the pump has two cylinders and each cylinder has a delivery directly connected to accumulator.

3. A hydraulic power transmission mechanism comprising a positive-displacement pump having a pumping chamber, means for varying the volume of the chamber cyclically, and means for driving said pump, a hydraulic motor for driving a load, inlet and delivery fluid lines between the pump and the motor, a pressurized accumulator for hydraulic fluid connected to the pump, and a non-return valve arrangement connected between the fluid lines downstream of the accumulator from the pump in which the pump has two cylinders and the accumulator has two fluid chambers, each connected to one pump cylinder and a common air chamber for pressurizing them.

4. A mechanism as claimed in claim 3 in which the non-return valve arrangement comprises four non-return valves connected in a bridge, the pump deliveries being connected to opposite points in the bridge.

5. A mechanism as claimed in claim 1 having a relief valve for preventing excessive pressure in the mechanism.

6. A hydraulic power transmission mechanism comprising a positive-displacement pump having a pumping chamber, means for varying the volume of the chamber cyclically, and means for driving said pump, a hydraulic motor for driving a load, inlet and delivery fluid lines between the pump and the motor, a pressurized accumulater for hydraulic fluid connected to the pump, and a non-return valve arrangement connected between the fluid lines downstream of the accumulator from the pump and including means responsive to pump speed for preventing power transmission at speeds below a predetermined speed.

7. A mechanism as claimed in claim 3 in which the responsive means is for permitting power transmission to take place gradually as pump speed increases above the predetermined speed.

8. A mechanism as claimed in claim 7 in which the means comprise a valve connected between the inlet and outlet of the motor and a pressure-operated device for closing the valve progressively from the predetermined speed to a speed greater than this but less than full pump speed.

9. A mechanism as claimed in claim 8 comprising a pump driven at a speed proportional to pump speed and connected to supply fluid to operate the device.

10. A mechanism as claimed in claim 1 in which the accumulator is air pressurised.

11. A mechanism as claimed in claim 10 in which the accumulator has an air chamber and a hydraulic fluid chamber, and in which the air chamber is smaller than the total pumping chamber swept volume per cycle.

12. A hydraulic power transmission mechanism comprising a positive-displacement pump having a pumping chamber, means for varying the volume of the chamber cyclically, and means for driving said pump, a hydraulic motor for driving a load, inlet and delivery fluid lines between the pump and the motor, a pressurized accumulator for hydraulic fluid connected to the pump, and a non-return valve arrangement connected between the fluid lines downstream of the accumulator from the pump in which hydraulic pressure is applied to the motor only during the part of a pump cycle in which the pump flow is greater than the flow corresponding to the motor speed.

13. A power transmission mechanism comprising a reciprocating hydraulic pump and a hydraulic motor connected to be driven by fluid pumped by the pump, an accumulator to which fluid in excess of the requirements of the motor is pumped, and non-return valve means through which fluid in the motor can circulate in that part of the pump cycle during which the motor exhaust pressure is greater than accumulator pressure.

14. A mechanism as claimed in claim 13 in which the non-return valve means is downstream of the accumulator.

15. A mechanism as claimed in claim 13 in which hydraulic pressure is applied to the motor only during the part of a pump cycle in which the pump flow is above the flow corresponding to the motor speed.

16. A mechanism as claimed in claim 15 in which the non-return valve means is downstream of the accumulator.

References Cited by the Examiner
UNITED STATES PATENTS

| | | | |
|---|---|---|---|
| 2,554,381 | 5/51 | Patterson | 60—53 |
| 2,597,050 | 5/52 | Audemar | 60—51 |
| 3,078,656 | 2/63 | Jedrzykowski | 60—53 X |

JULIUS E. WEST, *Primary Examiner.*

EDGAR W. GEOGHEGAN, *Examiner.*